US012076286B2

(12) United States Patent
Ferreira et al.

(10) Patent No.: US 12,076,286 B2
(45) Date of Patent: Sep. 3, 2024

(54) PATIENT LIFT APPARATUS

(71) Applicant: Invacare International GmbH, Witterswil (CH)

(72) Inventors: Joaquim Ferreira, Santa Maria da Feira (PT); Tiago De Seixas Guimarães, Senhora da Hora (PT); Mark Monteiro, VZ Badhoevedorp (NL); Stefan Lippert, Stuttgart (DE)

(73) Assignee: INVACARE INTERNATIONAL GMBH, Witterswil (CH)

( * ) Notice: Subject to any disclaimer, the term of this patent is extended or adjusted under 35 U.S.C. 154(b) by 411 days.

(21) Appl. No.: 17/428,696

(22) PCT Filed: Feb. 3, 2020

(86) PCT No.: PCT/IB2020/050836
§ 371 (c)(1),
(2) Date: Aug. 5, 2021

(87) PCT Pub. No.: WO2020/161594
PCT Pub. Date: Aug. 13, 2020

(65) Prior Publication Data

US 2022/0125654 A1 Apr. 28, 2022

(30) Foreign Application Priority Data

Feb. 6, 2019 (EP) .................................... 19155846
Feb. 6, 2019 (EP) .................................... 19155847

(51) Int. Cl.
*A61G 7/10* (2006.01)

(52) U.S. Cl.
CPC ......... *A61G 7/1017* (2013.01); *A61G 7/1038* (2013.01); *A61G 7/1046* (2013.01);
(Continued)

(58) Field of Classification Search
CPC .. A61G 7/1017; A61G 7/1038; A61G 7/1046; A61G 7/1051; A61G 7/1096;
(Continued)

(56) References Cited

U.S. PATENT DOCUMENTS 5,054,852 A * 10/1991 Tholkes ................. A61G 5/127
297/DIG. 10
5,489,258 A * 2/1996 Wohnsen ............. A61G 7/1051
602/5
(Continued)

FOREIGN PATENT DOCUMENTS

| | | |
|---|---|---|
| CH | 704421 | 7/2012 |
| DE | 20303002 | 7/2003 |

(Continued)

OTHER PUBLICATIONS

"Cord." Infoplease, www.infoplease.com/dictionary/cord (Year: 2004).*
(Continued)

*Primary Examiner* — Justin C Mikowski
*Assistant Examiner* — Madison Emanski
(74) *Attorney, Agent, or Firm* — Calfee, Halter & Griswold LLP

(57) ABSTRACT

There is described a patient lift apparatus comprising a supporting frame, a boom portion connected to the supporting frame via a pivot joint (PJ1) to allow the boom portion to pivot with respect to the supporting frame about a pivot axis (PA1), a boom actuator to mechanically assist pivotal movement of the boom portion with respect to the supporting frame, and a leg/knee support connected to the supporting frame. The leg/knee support is configured to be selectively releasable from the supporting frame and comprises a manually-operable release mechanism forming an integral part of the leg/knee support, which manually-operable release mechanism is configured to allow selective release of
(Continued)

the leg/knee support from the supporting frame. The manually-operable release mechanism comprises a retaining device configured to cooperate with a support mount provided on the supporting frame to secure the leg/knee support onto the supporting frame, and a manually-operable handle cooperating with the retaining device to allow selective release of the retaining device from the support mount and thereby allow removal of the leg/knee support from the supporting frame.

24 Claims, 12 Drawing Sheets

(52) U.S. Cl.
CPC ......... *A61G 7/1051* (2013.01); *A61G 7/1096* (2013.01); *A61G 2200/34* (2013.01)

(58) Field of Classification Search
CPC .... A61G 2200/34; A61G 5/14; A61G 7/1061; A61G 2200/36; A61G 5/127; A61B 90/60; Y10S 297/10; B62B 3/02; B62B 2202/42; A61H 3/04
USPC ............. 5/87.1, 83.1, 86.1, 81.1 R; 177/147; 297/DIG. 10
See application file for complete search history.

(56) References Cited

U.S. PATENT DOCUMENTS

| | | | | |
|---|---|---|---|---|
| 5,758,371 | A | 6/1998 | VanDyke et al. | |
| 8,250,687 | B2 | 8/2012 | Spidare et al. | |
| 9,295,597 | B2 * | 3/2016 | Hjort | A61G 7/1092 |
| 11,051,906 | B2 * | 7/2021 | Nardo | A61B 90/60 |
| 2009/0165203 | A1 * | 7/2009 | Biersteker | A61G 5/14 5/83.1 |
| 2010/0031439 | A1 * | 2/2010 | Spidare | A61G 7/1017 5/87.1 |
| 2011/0016628 | A1 | 1/2011 | Masterson, Jr. | |
| 2011/0056019 | A1 * | 3/2011 | Altena | A61G 7/1053 5/87.1 |
| 2015/0190293 | A1 * | 7/2015 | Hacikadiroglu | A61G 7/1019 5/87.1 |

FOREIGN PATENT DOCUMENTS

| | | | | |
|---|---|---|---|---|
| EP | 0019467 | A1 * | 5/1980 | A61G 7/1038 |
| EP | 2524682 | | 11/2012 | |
| ES | 2421058 | A2 * | 8/2013 | A61G 7/1076 |
| GB | 2346361 | A * | 8/2000 | A61G 7/1017 |
| GB | 2391536 | | 2/2004 | |
| GB | 2526679 | | 12/2015 | |
| JP | H10-192344 | | 7/1998 | |
| NL | 1012559 | C2 * | 1/2001 | A61G 7/1017 |
| NL | 1012559 | | 3/2001 | |
| NL | 1024909 | C2 * | 6/2005 | A61G 7/1017 |
| WO | 95/018592 | | 7/1995 | |
| WO | 96/11658 | | 4/1996 | |
| WO | 2010/017438 | | 2/2010 | |

OTHER PUBLICATIONS

Reliant 350 Stand Assist brochure, 2 pgs., Invacare Corporation, 2017.

Roze brochure, 2 pgs., Invacare Corporation, 2016.

International Search Report and Written Opinion from PCT/IB2020/050836, dated Apr. 3, 2020.

* cited by examiner

PATIENT LIFT APPARATUS

RELATED APPLICATIONS

This application is the national stage entry of PCT/IB2020/050836, filed on Feb. 3, 2020 which claims priority to European Application Nos. 19155846.9 and 19155847.7, both filed on Feb. 6, 2019, the entire disclosures of which are incorporated by reference.

TECHNICAL FIELD

The present invention generally relates to a patient lift apparatus employed for lifting and transferring patients, which apparatus is especially intended to be used in the health care industry. The patient lift apparatus of the invention is in particular intended to be used for providing safe and comfortable assisted transfers for those patients with limited mobility or rehabilitation needs, especially for the purpose of transferring such patients from a seated position to a standing position, and vice versa. In that respect, the patient lift apparatus of the invention may also be referred to as a stand assist hoist or lifter.

BACKGROUND OF THE INVENTION

Patient lift apparatuses are already known in the art and available on the market. Examples thereof include for instance Invacare®'s Reliant™ 350 and Roze stand assist products.

International (PCT) Publication No. WO 2010/017438 A2 discloses a patient lift apparatus as embodied in the form of Invacare®'s aforementioned Roze product. This known patient lift apparatus comprises a supporting frame, a boom portion connected to the supporting frame via a pivot joint to allow the boom portion to pivot with respect to the supporting frame about a pivot axis, and a boom actuator to mechanically assist pivotal movement of the boom portion with respect to the supporting frame. A distal end of the boom portion is configured to include hook portions configured to allow attachment of a sling for holding and supporting a patient during lifting and transfer. Handle portions are furthermore provided on the boom portions to provide the patient with the option of a manual grip helping stabilization during patient lifting and transfer. This patient lift apparatus further comprises a leg/knee support (or "leg/knee pad") and a foot support (or "foot plate"), both connected to the supporting frame. According to WO 2010/017438 A2, the leg/knee support is configured to be adjustable in height to adjust the position thereof to different needs and patient morphologies. More precisely, the leg/knee support is mounted on a vertical guide and rail mechanism configured to allow positioning of the leg/knee support at any desired vertical position.

According to WO 2010/017438 A2, the length of the boom portion is fixed and not adjustable. Patient lift apparatuses of the type comprising a length-adjustable boom portion are however known in the art.

U.S. Pat. No. 5,758,371 A for instance discloses a patient lift apparatus where the boom portion is configured as a telescopic arm comprising an outer member and an inner member that is telescopically received inside the outer member to allow displacement of the inner member with respect to the outer member and adjustment of an effective length of the telescopic arm.

US Patent Publication No. US 2011/0016628 A1 similarly discloses a patient lift apparatus of the type comprising a boom portion that is configured as a telescopic arm. In this particular instance, a simple pin-and-hole arrangement is provided to allow adjustment of the inner member of the telescopic arm at any desired one of a plurality of predefined longitudinal positions with respect to the outer member.

European Patent Publication No. EP 2 524 682 A1 discloses yet another example of a patient lift apparatus of the type comprising a boom portion that is configured as a telescopic arm.

The solutions disclosed in U.S. Pat. No. 5,758,371 A, US 2011/0016628 A1 and EP 2 524 682 A1 are useful in allowing adjustment of the patient lift apparatus to the actual size of each patient and to adjust the lifting amplitude to match the relevant need. Such solutions are not however entirely satisfactory from the point of view of the adjustability of the effective length of the boom portion. Furthermore, the necessary clearance, or play, between the inner and outer members of the telescopic arm may be to the detriment of comfort for the patient as the inner member may move under load within the space provided inside the outer member, leading to undesired and unpleasant movement for the patient during lifting and/or transfer.

International (PCT) Publication No. WO 95/18592 A1 discloses a patient lift apparatus similar to that of WO 2010/017438 A2 where the leg/knee support is additionally configured to be releasable from the supporting frame. In this particular instance, the leg/knee support can be adjusted in height and potentially be released by actuating a simple thumbscrew.

According to WO 2010/017438 A2, the guide and rail mechanism includes a guide portion that forms an integral part of the supporting frame and of the locking/unlocking arrangement used to secure the leg/knee support to the supporting frame. More specifically, the guide portion is affixed to an accessory frame portion, or support mount, extending from the supporting frame, and the leg/knee support can be selectively released from the supporting mount by means of release handle provided on the guide portion. The leg/knee support of WO 2010/017438 A2 merely comprises a rail portion that is slidably guided inside the guide portion and selectively lockable in position by means of the locking/unlocking arrangement. Furthermore, the leg/knee support of WO 2010/017438 A2 includes a handle, but this handle has no particular locking or unlocking function. As simpler, better integrated solution is therefore desirable.

Swiss Patent Publication No. CH 704 421 A2 discloses a patient lift apparatus of the type comprising a pair of leg/knee supports mounted on a vertically-adjustable support that is guided along the support frame of the patient lift apparatus. Each leg/knee support is mounted on the vertically-adjustable support by means of a guide member that can be locked onto or released from an associated L-shaped support member by actuating a simple thumbscrew/handscrew.

British Patent Publication GB 2 526 679 A discloses yet another patient lift apparatus comprising a leg/knee support than can potentially be released from the supporting frame of the patient lift apparatus by actuating a retractable locking pin that is configured to cooperate with any one of a plurality of indexing holes (or indents) formed on an arm attached to a read portion of the leg/knee support. According to GB 2 526 679 A, the retractable locking pin does not form part of the leg/knee support per se, but is provided on a support mount that is secured to the supporting frame.

International (PCT) Publication No. WO 96/11658 A1 discloses a patient lift apparatus where the leg/knee support is adapted to pivot about a pivot axis and thereby follow movement of the patient's legs/knees upon standing or sitting.

Dutch Patent No. NL 1012559 C2 similarly discloses a patient lift apparatus comprising a leg/knee support that can be pivoted about a pivot axis. In this particular instance, electric motors are provided to cause pivotal movement of the leg/knee support.

The aforementioned known solutions are not fully satisfactory, and there remains a need for an improved solution.

SUMMARY OF THE INVENTION

A general aim of the invention is to provide an improved patient lift apparatus.

More specifically, an aim of the present invention is to provide such a patient lift apparatus of the type comprising a leg/knee support, which patient lift apparatus does not suffer from the shortcomings of the above-mentioned known solutions.

Yet another aim of the invention is to provide such a solution which is both robust and easy to handle and operate for the patient and caregiver.

A further aim of the invention is to provide such a solution which provides greater comfort for the patient during assisted transfer in the area of the leg/knee support.

Still another aim of the invention is to provide such a solution that is particularly suited to act as stand assist hoist for the purpose of transferring patients from a seated position to a standing position, and vice versa, with improved adjustability to the patient's needs and morphology.

These aims are achieved thanks to the solutions defined in the claims.

In accordance with a first aspect of the invention, there is provided a patient lift apparatus according to claim 1, namely a patient lift apparatus comprising a supporting frame, a boom portion connected to the supporting frame via a pivot joint to allow the boom portion to pivot with respect to the supporting frame about a pivot axis, a boom actuator to mechanically assist pivotal movement of the boom portion with respect to the supporting frame, and a leg/knee support connected to the supporting frame. The leg/knee support is configured to be selectively releasable from the supporting frame. According to this first aspect of the invention, the leg/knee support comprises a manually-operable release mechanism forming an integral part of the leg/knee support, which manually-operable release mechanism is configured to allow selective release of the leg/knee support from the supporting frame, said manually-operable release mechanism comprising:

- a retaining device configured to cooperate with a support mount provided on the supporting frame to secure the leg/knee support onto the supporting frame; and
- a manually-operable handle cooperating with the retaining device to allow selective release of the retaining device from the support mount and thereby allow removal of the leg/knee support from the supporting frame.

According to a preferred embodiment, the leg/knee support is configured to be slidable along the support mount upon being released by the manually-operable release mechanism. In this context, the retaining device comprises first and second retaining members forming a spacing therebetween and which are configured to act as a guide dimensioned to receive the support mount, the retaining members being designed so that the leg/knee support can be slid onto the support mount.

The manually-operable handle can in particular be configured as a sliding handle provided on top of the leg/knee support.

By way of preference, the manually-operable release mechanism further comprises a cable coupling the manually-operable handle to the retaining device and translating a movement of the manually-operable handle into a release action of the retaining device.

According to a particularly preferred embodiment, the retaining device comprises a releasable indexing plunger having a retractable end portion configured to engage with at least one positioning hole provided on the support mount. In this particular context, the support mount may comprise a plurality of positioning holes distributed along a portion of the support mount and the retractable end portion of the releasable indexing plunger may be configured to engage with any selected positioning hole among the plurality of positioning holes to allow adjustment of a vertical position of the leg/knee support with respect to the supporting frame.

The aforementioned releasable indexing plunger is preferably a spring-loaded indexing plunger whose retractable end portion is configured to be urged towards the support mount and to automatically engage with each positioning hole upon alignment therewith.

In accordance with a further embodiment of the invention, the leg/knee support may be configured to be partly pivotable with respect to the support mount about a pivot axis and within a defined pivoting range. In this particular context, the leg/knee support in particular comprises an outer casing configured to be pivotable with respect to the retaining device about said pivot axis and within said defined pivoting range.

In this latter, preferred context, the leg/knee support may advantageously further comprise at least one spring element coupling the outer casing to the retaining device, which at least one spring element is configured to bring the outer casing to a default position with respect to the retaining device when no external force is applied onto the outer casing.

These latter features can advantageously be implemented independently of the aforementioned manually-operable release mechanism. In that respect, in accordance with another aspect of the invention, there is provided a patient lift apparatus according to claim 12, namely a patient lift apparatus comprising a supporting frame, a boom portion connected to the supporting frame via a pivot joint to allow the boom portion to pivot with respect to the supporting frame about a pivot axis, a boom actuator to mechanically assist pivotal movement of the boom portion with respect to the supporting frame, and a leg/knee support connected to the supporting frame. According to this other aspect of the invention, the leg/knee support comprises:

- a retaining device configured to cooperate with a support mount provided on the supporting frame to secure the leg/knee support onto the supporting frame, the leg/knee support being configured to be partly pivotable with respect to the support mount about a pivot axis and within a defined pivoting range;
- an outer casing configured to be pivotable with respect to the retaining device about said pivot axis and within said defined pivoting range; and
- at least one spring element coupling the outer casing to the retaining device, which at least one spring element is configured to bring the outer casing to a default position with respect to the retaining device when no external force is applied onto the outer casing.

By way of preference, a pair of said spring elements may be provided, which pair of spring elements is configured to bring the outer casing to the default position, which default position is a median position between two extreme, tilted positions. Each spring element is attached to a corresponding spring mount provided on the outer casing, which spring mount may further act as stop element limiting pivotal movement of the outer casing about the pivot axis.

Each spring element may in particular be a tension spring.

According to a further embodiment of the invention, a total amplitude of pivoting movement of the leg/knee support with respect to the support mount is preferably of the order of 10 to 30 degrees.

The boom portion may advantageously be configured as a telescopic arm comprising an outer member and an inner member that is telescopically received inside the outer member to allow displacement of the inner member with respect to the outer member and adjustment of an effective length of the telescopic arm. In this context, the patient lift apparatus preferably further comprises an indexing mechanism configured to allow positioning of the inner member at a plurality of predefined longitudinal positions with respect to the outer member.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the embodiments disclosed herein.

As described herein, when two or more parts or components are described as being connected, secured or coupled to one another, they can be so connected, secured or coupled directly to each other or through one or more intermediary parts.

Figure 1:
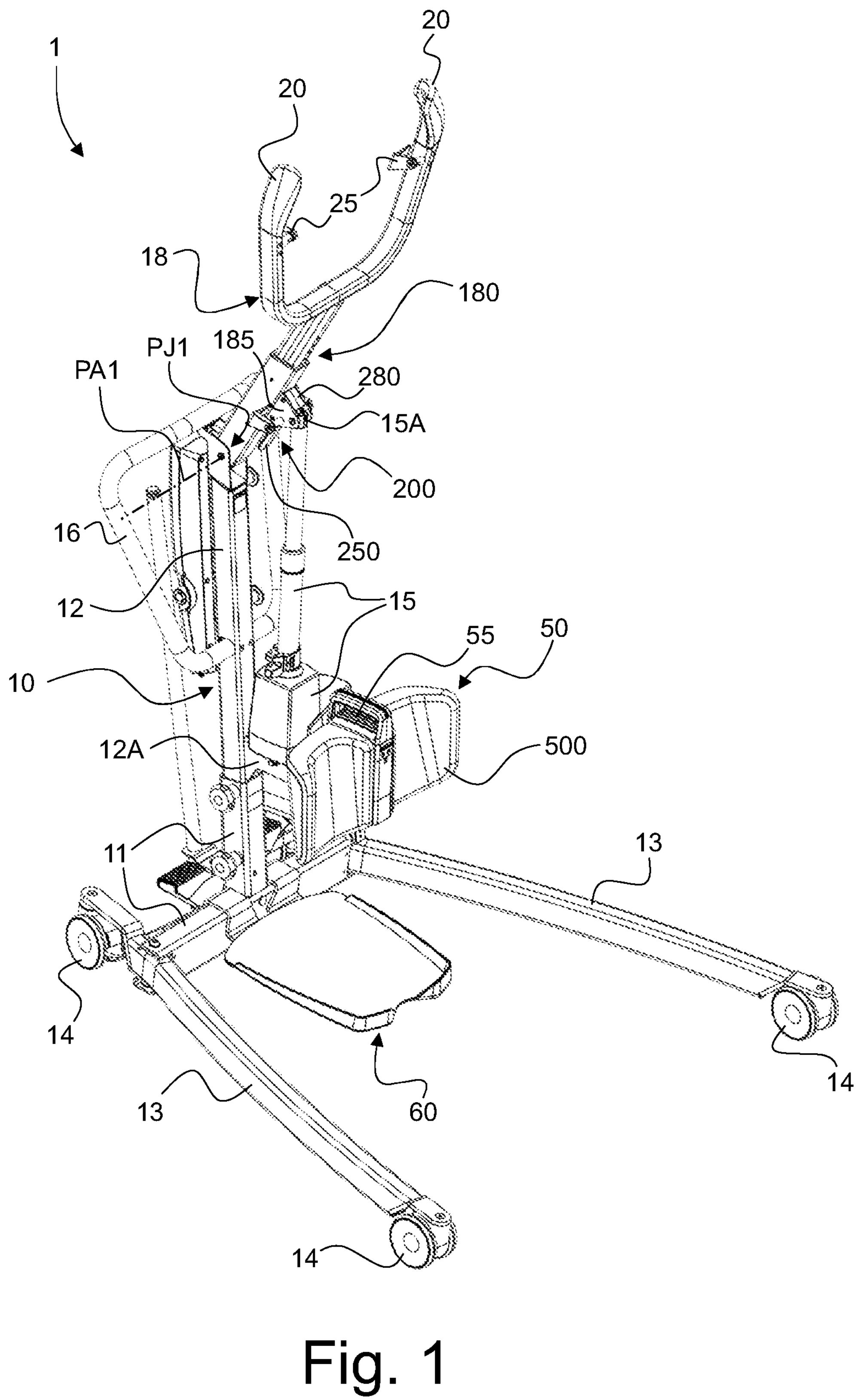
FIG. 1 is a perspective view of a patient lift apparatus, or stand assist hoist, in accordance with a preferred embodiment of the invention.
Figure 2:
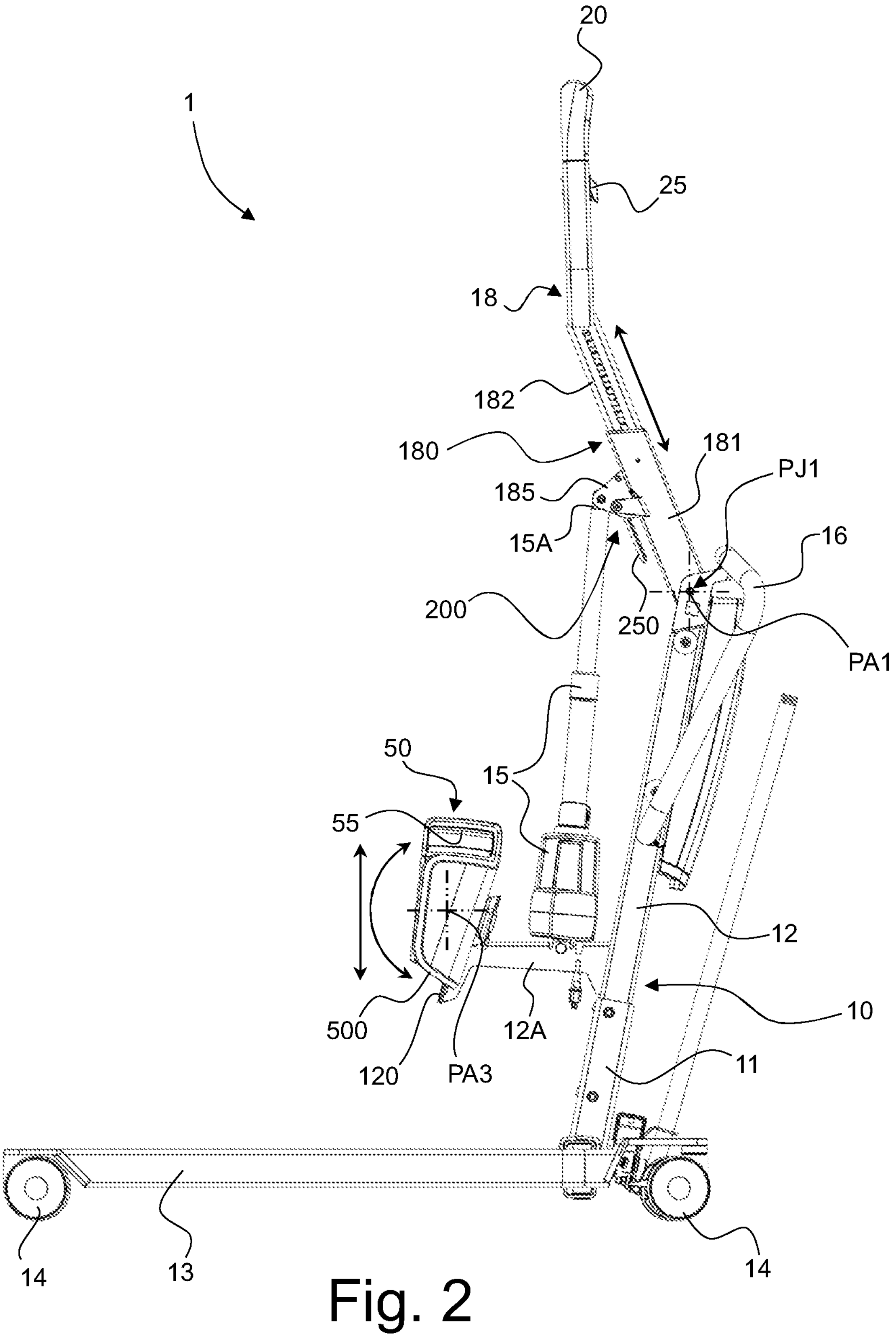
FIG. 2 is a side view of the patient lift apparatus of FIG. 1 showing a boom portion thereof that is configured as a telescopic arm comprising an outer member and an inner member that is telescopically received inside the outer member to allow displacement of the inner member with respect to the outer member.

The invention will be described in relation to various embodiments of a patient lift apparatus, as depicted in FIGS. 1 to 6A-B. The patient lift apparatus shown in FIGS. 1 and 2 is generally designated by reference numeral 1 and is especially designed to act as stand-assist hoist for the purpose of transferring patients from a seated position to a standing position, and vice versa.

Referring to FIGS. 1 and 2, there is shown a perspective view and a side view, respectively, of the patient lift apparatus 1, which apparatus 1 includes a supporting frame 10 comprising a base member 11, a mast 12 and a pair of supporting legs 13 provided at their ends with casters 14. An opening angle of the supporting legs 13 is advantageously adjustable by means of an adjustment device located on a rear end of the patient lift apparatus 1, as is known in the art. A suitable steering handle 16 is provided on the mast 12 to allow a caregiver to move and position the apparatus 1 according to the needs.

A boom portion 18 is connected to the supporting frame 10, namely to mast 12, via a pivot joint PJ1 thereby allowing the boom portion 18 to pivot with respect to the mast 12 about a pivot axis PA1. Pivot axis PA1 is understood to extend essentially parallel to a horizontal plane in the illustrated example. A boom actuator 15 is further provided to mechanically assist pivotal movement of the boom portion 18 with respect to the mast 12, which boom actuator 15 is mounted, at a lower end, on a mast extension 12A extending away from the mast 12. An upper end of the boom actuator 15, designated by reference sign 15A, is connected to the boom portion 18, namely via a mounting bracket 185 located on a lower portion of the boom portion 18. The boom actuator 15 can for instance be an electrically driven screw-type, hydraulic or pneumatic actuator, as is known in the art.

At a distal end of the boom portion 18, the boom portion 18 is here configured to exhibit a pair of arms, forming an integral part of the boom portion 18, each arm comprising a handle portion 20 shaped to provide a manual grip for the patient. Also provided on each arm is at least one hook portion 25 for attachment of a sling (not shown).

Figure 2A:
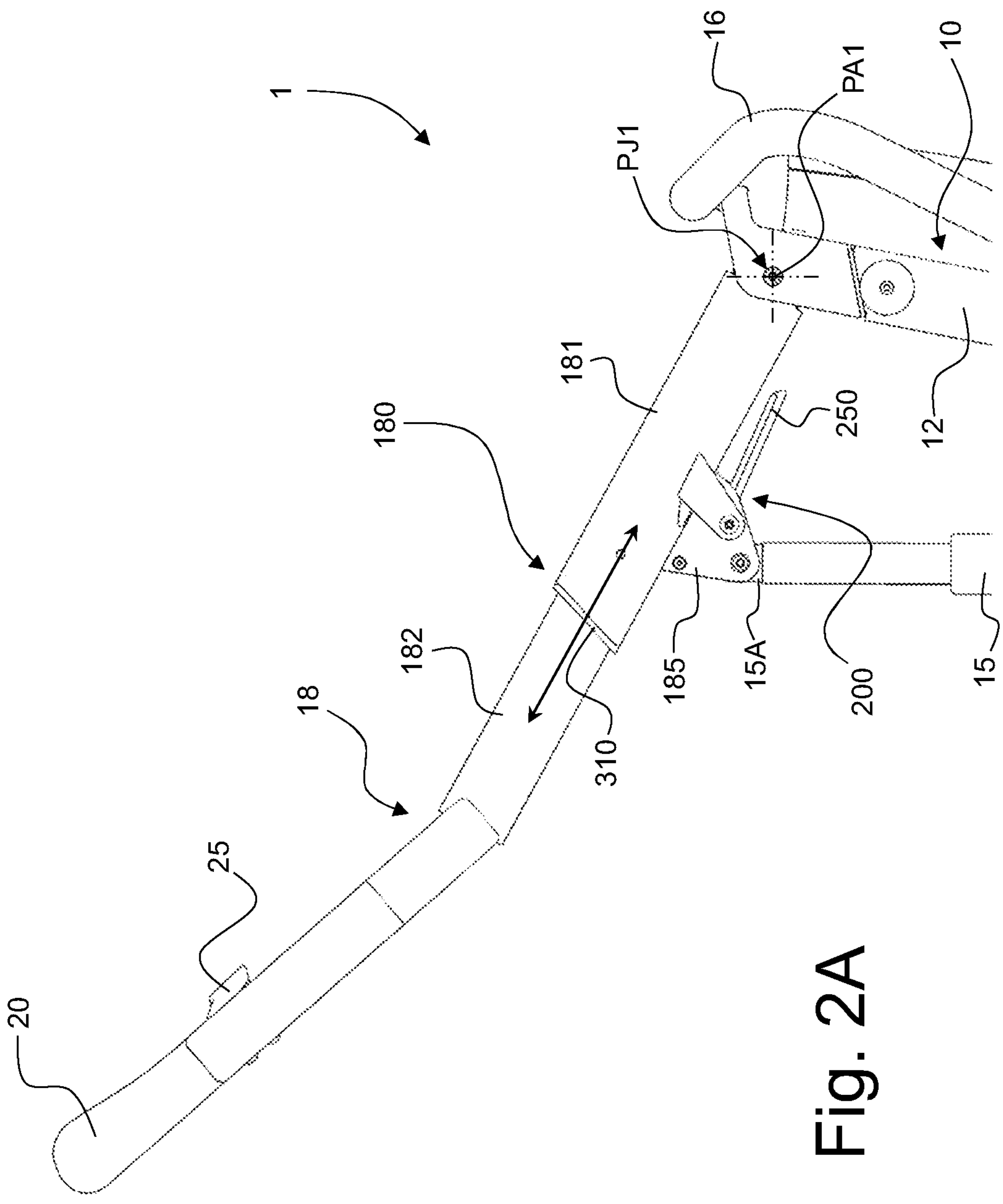
FIG. 2A is a partial side view of the patient lift apparatus of FIG. 1 showing the boom portion pivoted to a lower position compared to that shown in FIG. 2.

In the illustrated example, the boom portion 18 is configured as a telescopic arm 180 comprising (see especially FIGS. 2 and 2A) an outer member 181 and an inner member 182 that is telescopically received inside the outer member 181 to allow displacement of the inner member 182 with respect to the outer member 181 and adjustment of an effective length of the telescopic arm 180, as schematically illustrated by the double arrow in FIG. 2 (see also FIG. 2A).

Figure 3A:
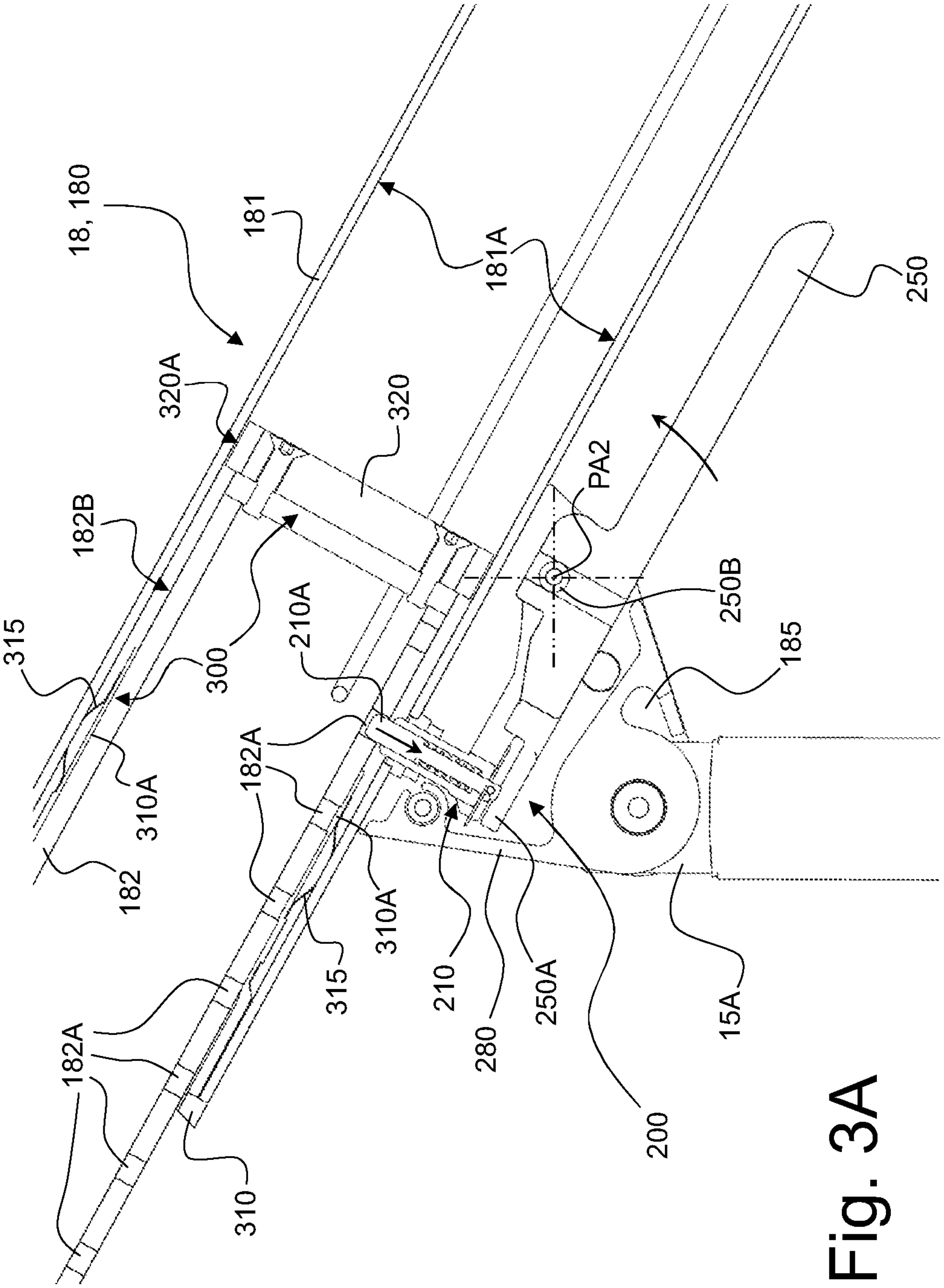
FIG. 3A is an enlarged partial side view of a cross-section of the telescopic arm of the patient lift apparatus of FIG. 1 showing an indexing mechanism configured to allow positioning of the inner member at a plurality of predefined longitudinal positions with respect to the outer member, the indexing mechanism being shown in a state where it engages with the telescopic arm.
Figure 3B:
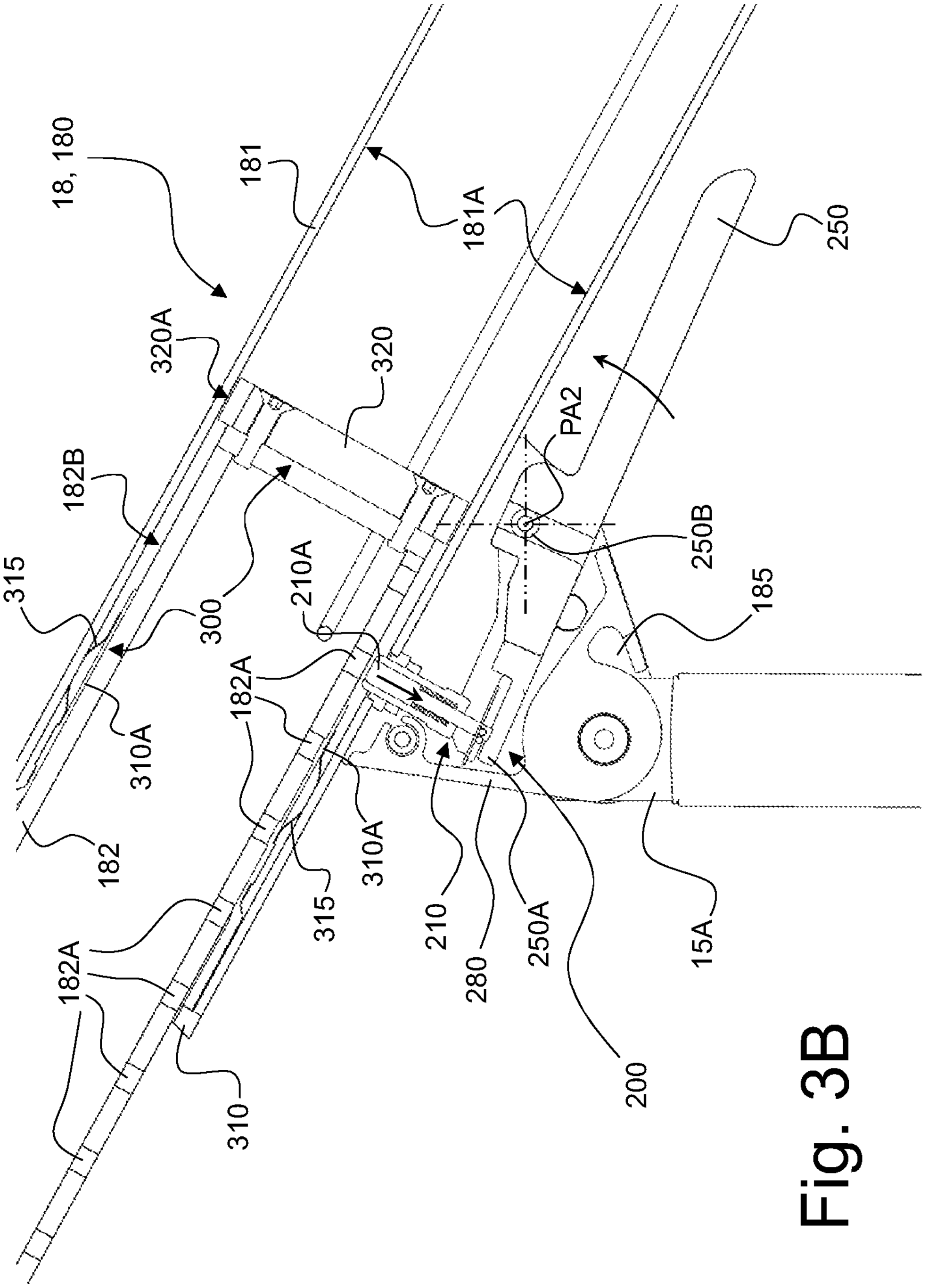
FIG. 3B is an enlarged partial side view of the same cross-section of the telescopic arm as depicted in FIG. 3A, the indexing mechanism being shown in a state where it is disengaged from the telescopic arm to allow the inner member to be displaced with respect to the outer member.
Figure 4A:
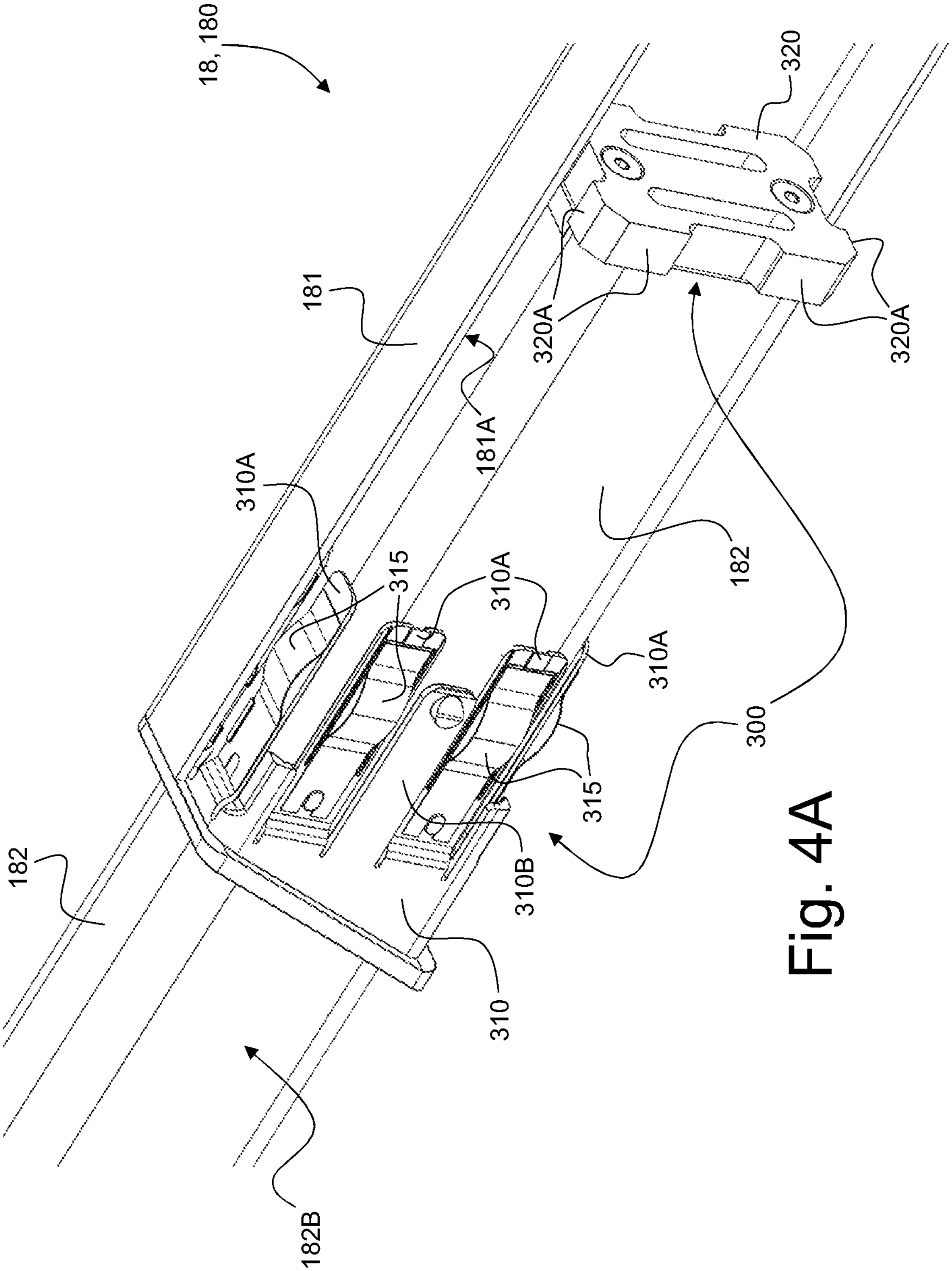
FIG. 4A is an enlarged partial perspective view of a section of the telescopic arm of the patient lift apparatus of FIG. 1 showing a centering system configured to center the inner member with respect to the outer member and suppress a clearance between the inner member and outer member.
Figure 4B:
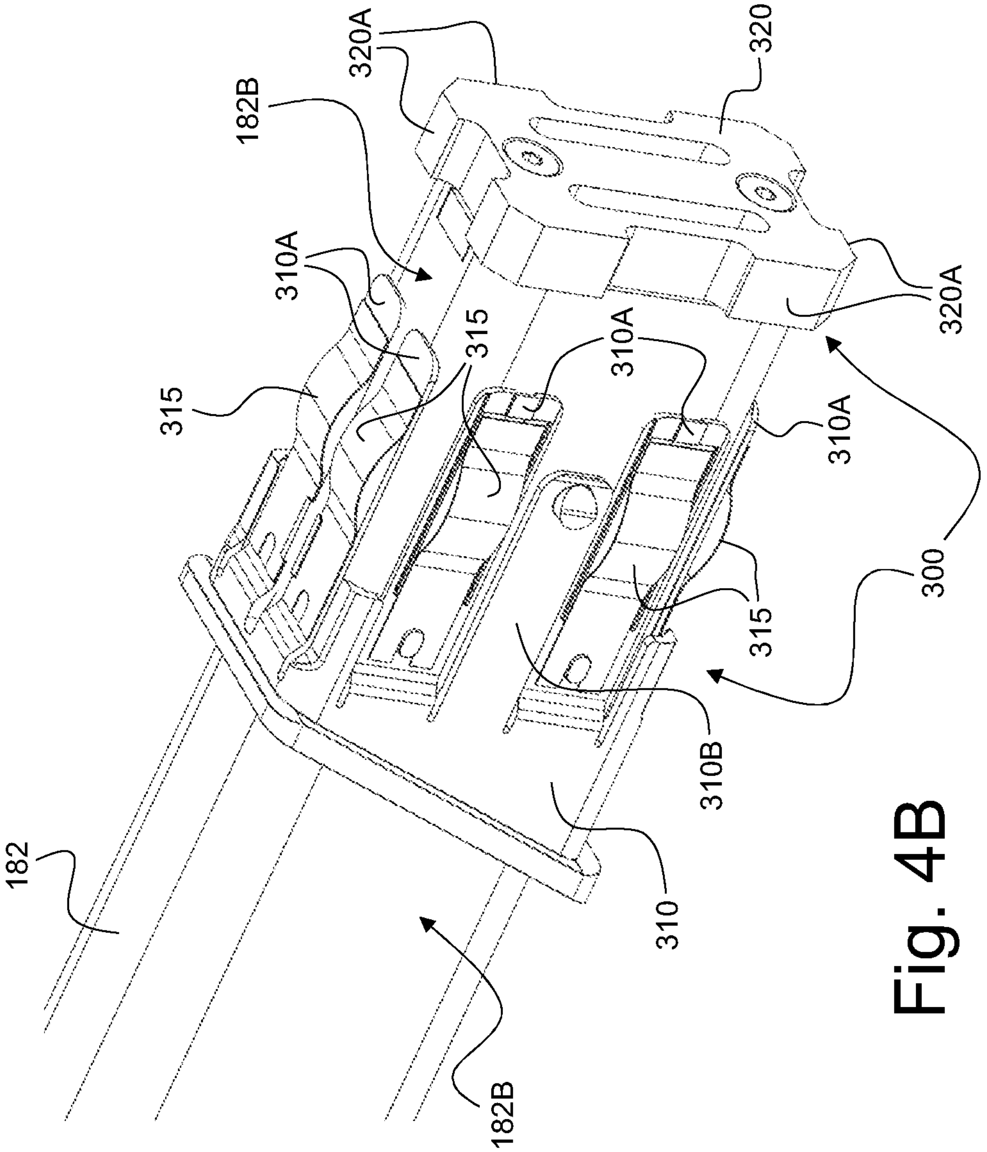
FIG. 4B is an enlarged partial perspective view of the centering system of FIG. 4A, with the outer member being omitted for the purpose of illustration.

In accordance with an embodiment of invention, as for instance illustrated by FIGS. 4A-B, the patient lift apparatus 1 further comprises a centering system, which centering system is configured to center the inner member 182 with respect to the outer member 181 and reduce or suppress a clearance between the inner member 182 and the outer member 181. A particularly advantageous embodiment of this centering system is shown in FIGS. 4A-B (see also FIGS. 3A-B), and generally designated by reference numeral 300, which centering system 300 will be described in greater detail hereafter.

In accordance with another embodiment of the invention, the patient lift apparatus 1 further comprises an indexing mechanism configured to allow positioning of the inner member 182 at a plurality of predefined longitudinal positions with respect to the outer member 181. A particularly advantageous embodiment of this indexing system is shown in FIGS. 3A-B, as well as partly visible in FIGS. 1, 2 and 2A, and generally designated by reference numeral 200, which indexing mechanism 200 will be described in greater detail hereafter.

Figure 2B:
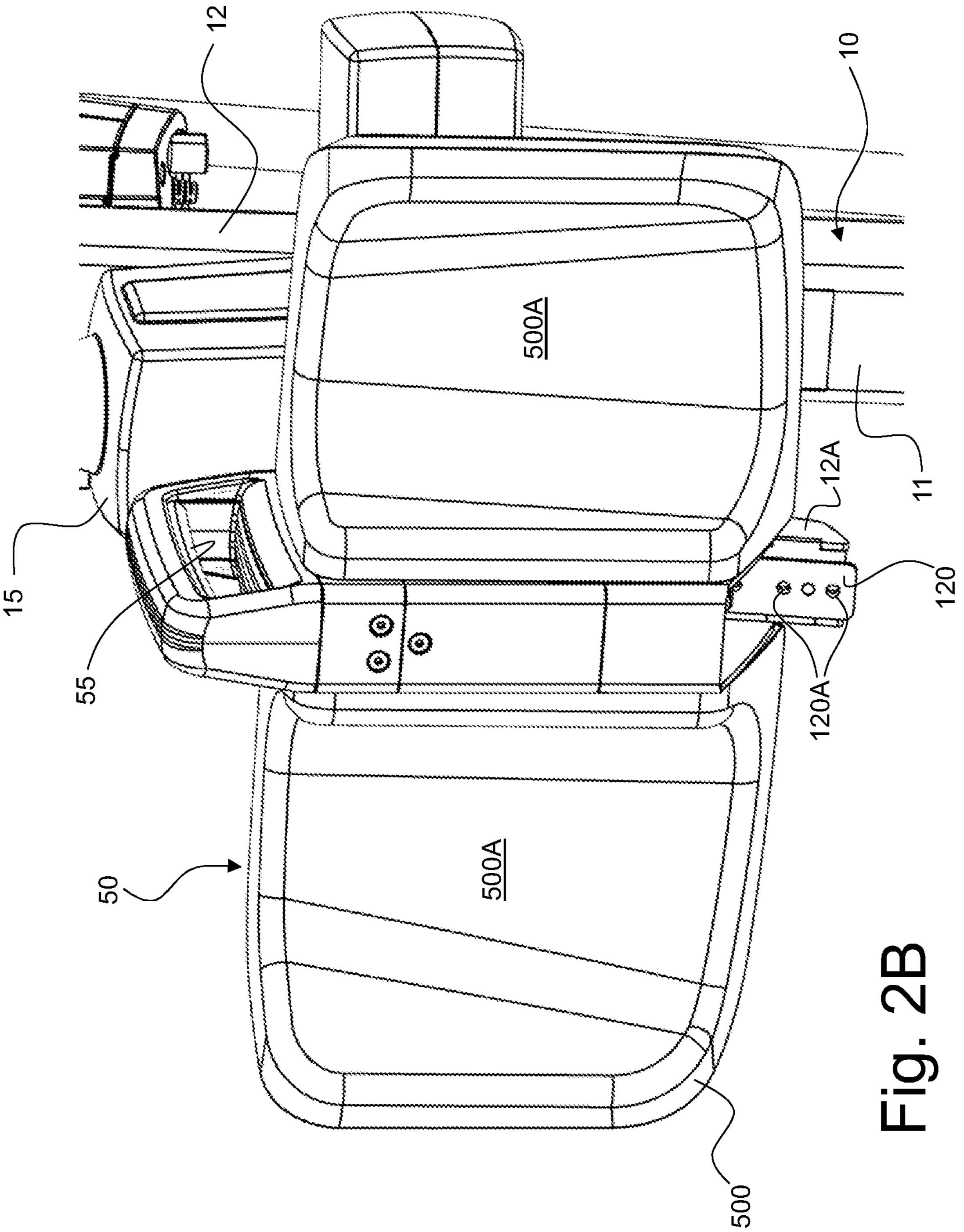
FIG. 2B is an enlarged partial perspective view of the patient lift apparatus of FIG. 1 showing a leg/knee support as mounted on a supporting frame of the patient lift apparatus.

Also visible in FIGS. 1 and 2 is a leg/knee support (or "leg/knee pad") 50 connected to the supporting frame 10, which leg/knee support 50 is shaped and advantageously padded to provide support for the patient's legs or knees during transfer of the patient from a seated position to a standing position, and vice versa. The leg/knee support 50 is also shown in greater detail on FIG. 2B, reference sign 500A designating two support surfaces extending laterally for supporting the patient's legs/knees. The leg/knee support 50 is connected to the supporting frame 10, namely to the mast 12, via the aforementioned mast extension 12A. Also shown in FIGS. 1 and 2 is an optional foot support (or "foot plate") 60, which foot support 60 is configured to receive the patient's feet. In accordance with a first aspect of the invention, the leg/knee support 50 is configured to be selectively releasable from the supporting frame 10. The foot support 60 may likewise be configured to be selectively releasable from the supporting frame 10.

Figure 2C:
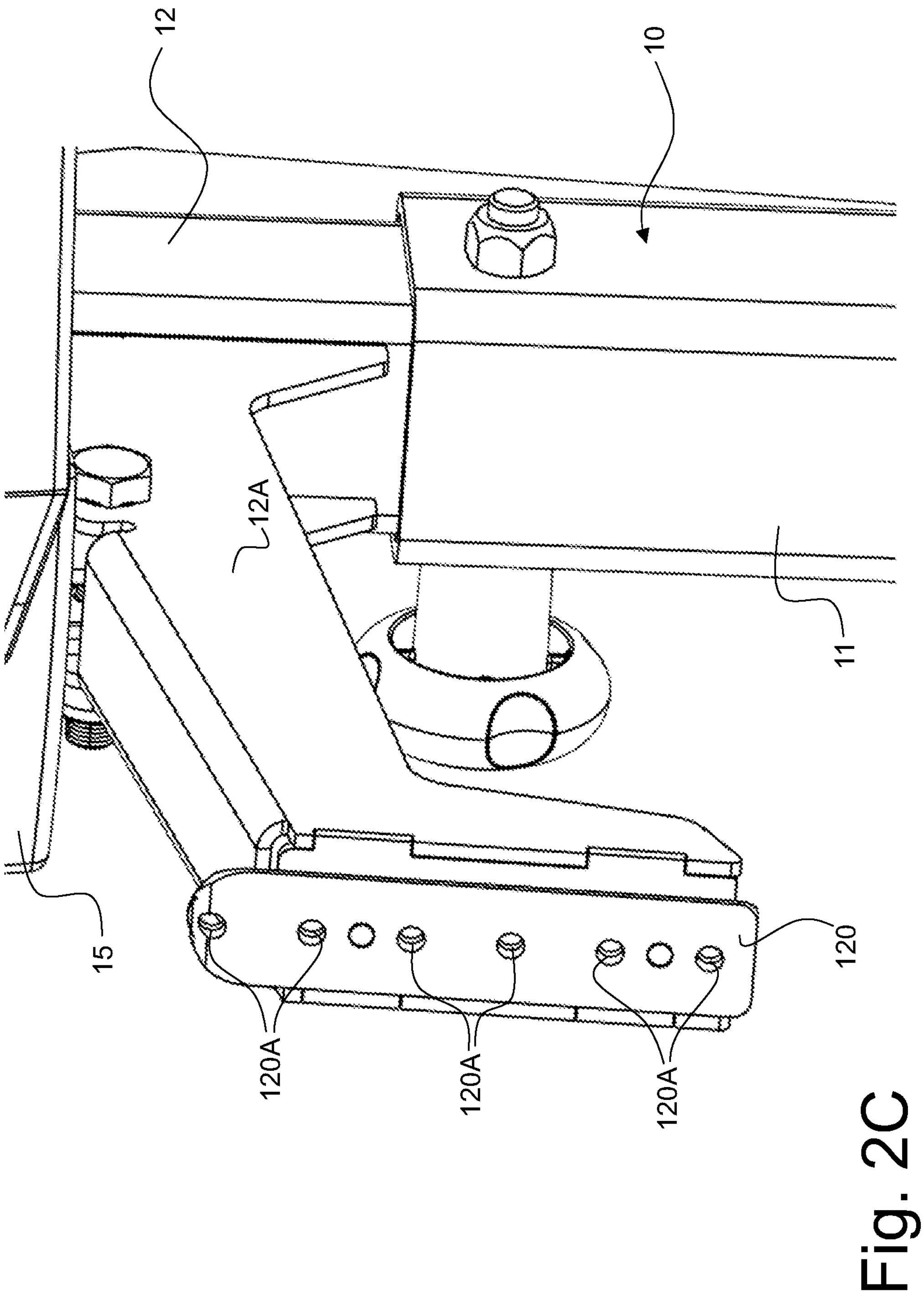
FIG. 2C is an enlarged partial perspective view of a support mount provided on the supporting frame, namely at a distal end of a mast extension, for connection of the leg/knee support of FIG. 2B.

A support mount 120 is provided on the supporting frame 10, namely at a distal end of the mast extension 12A, to secure the leg/knee support 50 onto the supporting frame. Part of this support mount 120 is visible on FIG. 2 and FIG. 2B. In the illustrated embodiment, upon being released, the leg/knee support 50 can be removed from the support mount 120 by sliding the leg/knee support 50 upward along the support mount 120, the support mount 120 acting as a guide. FIG. 2C illustrates the support mount 120, without the leg/knee support 50 connected thereto.

FIG. 3A is an enlarged partial side view of a cross-section of the telescopic arm 180 of the patient lift apparatus 1 of FIG. 1 showing a particularly preferred embodiment of the indexing mechanism 200. In accordance with this preferred embodiment, the indexing mechanism 200 comprises a releasable indexing plunger 210 mounted on the outer member 181 and having a retractable end portion 210A configured to engage with any selected positioning hole among a plurality of positioning holes 182A that are distributed longitudinally along a portion of the inner member 182. FIG. 3A shows the retractable end portion 210A engaged with the second positioning hole 182A provided on the inner member 182 starting from the right. Eight positioning holes 182A are visible in FIG. 3A, but it should be appreciated that any number of positioning holes 182A could be provided. The actual number of positioning holes 182A, and the distribution thereof along the length of the inner member 182, will be determined according to the needs, especially the desired overall amplitude of adjustment of the effective length of the telescopic arm 180 and the amplitude of each individual adjustment step.

As illustrated, the indexing mechanism 200 further comprises a manually-operable release lever 250 that is mechanically linked to the releasable indexing plunger 210 to selectively allow retraction of the retractable end portion 210A of the indexing plunger 210 out of engagement with the selected positioning hole 182A, thereby releasing the inner member 182 and allowing repositioning thereof with respect to the outer member 181 at a different one of the predefined longitudinal positions. FIG. 3B shows the retractable end portion 210A retracted out of engagement from the positioning hole 182A. In the illustrated embodiment, one end 250A of the manually-operable release lever 250 is coupled to the releasable indexing plunger 210 and an intermediate portion of the manually-operable release lever 250 is configured to act as a pivot 250B about which the manually-operable lever 250 can pivot, upon being manually operated, as illustrated by FIGS. 3A-B, to cause retraction of the retractable end portion 210A of the indexing plunger 210. The relevant pivot axis of the manually-operable lever 250 is shown in FIGS. 3A-B and designated by reference sign PA2.

By way of preference, the indexing mechanism 200 is located on a lower portion of the outer member 181. In that respect, in the illustrated embodiment, the release lever 250 is pivotably supported onto the same mounting bracket 185 as the upper end 15A of the boom actuator 15, which leads to a particularly simple and elegant integration of the indexing mechanism 200. In that context, it is advantageous, for safety purposes, to additionally provide a cover element 280 located on the mounting bracket 185, as shown in FIGS. 3A-B (see also FIG. 1), to cover part of the indexing mechanism 200, namely the indexing plunger 210 and the end 250A of the release lever 250, and thereby prevent finger or hand entrapment.

The releasable indexing plunger 210 is preferably a spring-loaded indexing plunger whose retractable end portion 210A is configured to be urged towards an inner side of the outer member 181 and to automatically engage with any one of the plurality of positioning holes 182A provided on the inner member 182 upon alignment therewith.

In the illustrated example, disengagement of the retractable end portion 210A of the releasable indexing plunger 210 is caused by a slight pivoting movement of the release lever 250 about the pivot axis PA2, namely in a counter-clockwise direction in the illustration of FIGS. 3A-B (as schematically illustrated by the curved arrow), i.e. by pressing the free end of the release lever 250 upward towards the outer member 181.

FIG. 4A is an enlarged partial perspective view of a section of the telescopic arm 180 of the patient lift apparatus 1 of FIG. 1 showing a particularly preferred embodiment of the centering system 300. This centering system 300 is also visible in FIGS. 3A-B. Part of the outer member 181 has been omitted in the illustration of FIG. 4A for the purpose of explanation. According to this particularly preferred embodiment, the centering system 300 includes a first centering element, designated by reference numeral 310, mounted on the outer member 181 and interposed between an inner side 181A of the outer member 181 and an outer periphery 182B of the inner member 182. The centering system 300 further comprises a second centering element, designated by reference numeral 320, mounted on the inner member 182 and guided inside the outer member 181. In the illustrated embodiment, the first and second centering elements 310, 320 are configured to suppress the clearance between the outer member 181 and the inner member 182. The provision of the first and second centering elements 310, 320 is advantageous in that the centering elements 310, 320 can be designed to have better dimensional tolerances than that of the inner and outer member 181, 182, thereby eliminating play in the telescopic arm 180

By way of preference, the first centering element is configured as a bushing member 310 mounted on a distal end portion of the outer member 181. A portion 310A, 310B of this bushing member 310 extends between the inner side 181A of the outer member 181 and the outer periphery 182B of the inner member 182, as this is visible in FIG. 4A. FIG. 4B shows the bushing member 310 with the outer member 181 being entirely omitted for the purpose of explanation. The second centering element is configured as a guiding member 320 mounted on a distal end portion of the inner member 182 and guided inside the outer member 181, as likewise shown in FIG. 4A. Guide surfaces 320A are provided on the periphery of the guide member 320 for guidance against the inner side 181A of the outer member 181.

Preferably, the bushing member 310 comprises a plurality of extensions 310A extending longitudinally between the inner side 181A of the outer member 181 and the outer periphery 182B of the inner member 182 and a plurality of flat spring elements 315 located on said extensions 310A. A total of eight such extensions 310A and flat spring elements 315 are provided in the illustrated example, disposed in pairs along each of four sides, but it should be appreciated that any number of extensions and spring elements, and geometry, could be contemplated. In the illustrated example, the flat spring elements 315 are interposed between the inner side 181A of the outer member 181 and the extensions 310A to press these extensions 310A inwardly towards the outer periphery of the inner member 182 (see also FIGS. 3A-B), thereby suppressing any play between the outer and inner members 181, 182

Reference sign 310B in FIGS. 4A-B designates a further extension provided on each lateral side of the bushing member 310 to secure the bushing member 310 to the distal end of the outer member 181. This extension 310B is provided with a locking tab designed to engage with a corresponding mounting aperture provided on the outer member 181 (which mounting aperture is visible on FIGS. 1, 2 and 2A).

By way of preference, the centering system 300, which is mounted on the outer member 181 and the inner member 182, is configured such as not to interfere with operation of the releasable indexing plunger 210 of the aforementioned indexing mechanism 200.

The aforementioned solution to suppress the clearance between the outer and inner members 181, 182 of the telescopic arm 180 is particularly simple and robust. Other solutions could however be contemplated to reduce or suppress the clearance between the outer and inner members 181, 182, including solutions making use of e.g. an adjustable mechanism or an articulated linkage mounted on the inner member 182 and configured to translate a longitudinal displacement of a movable adjustment member into a radial displacement of two or more centering elements cooperating with the inner side 181A of the outer member 181. Similarly, centering of the inner member 182 with respect to the outer member 181 could also be performed by means of a radially-adjustable mandrel device mounted within the inner member 182 and projecting through the inner member 182 toward the inner side 181A of the outer member 181.

Figure 5:
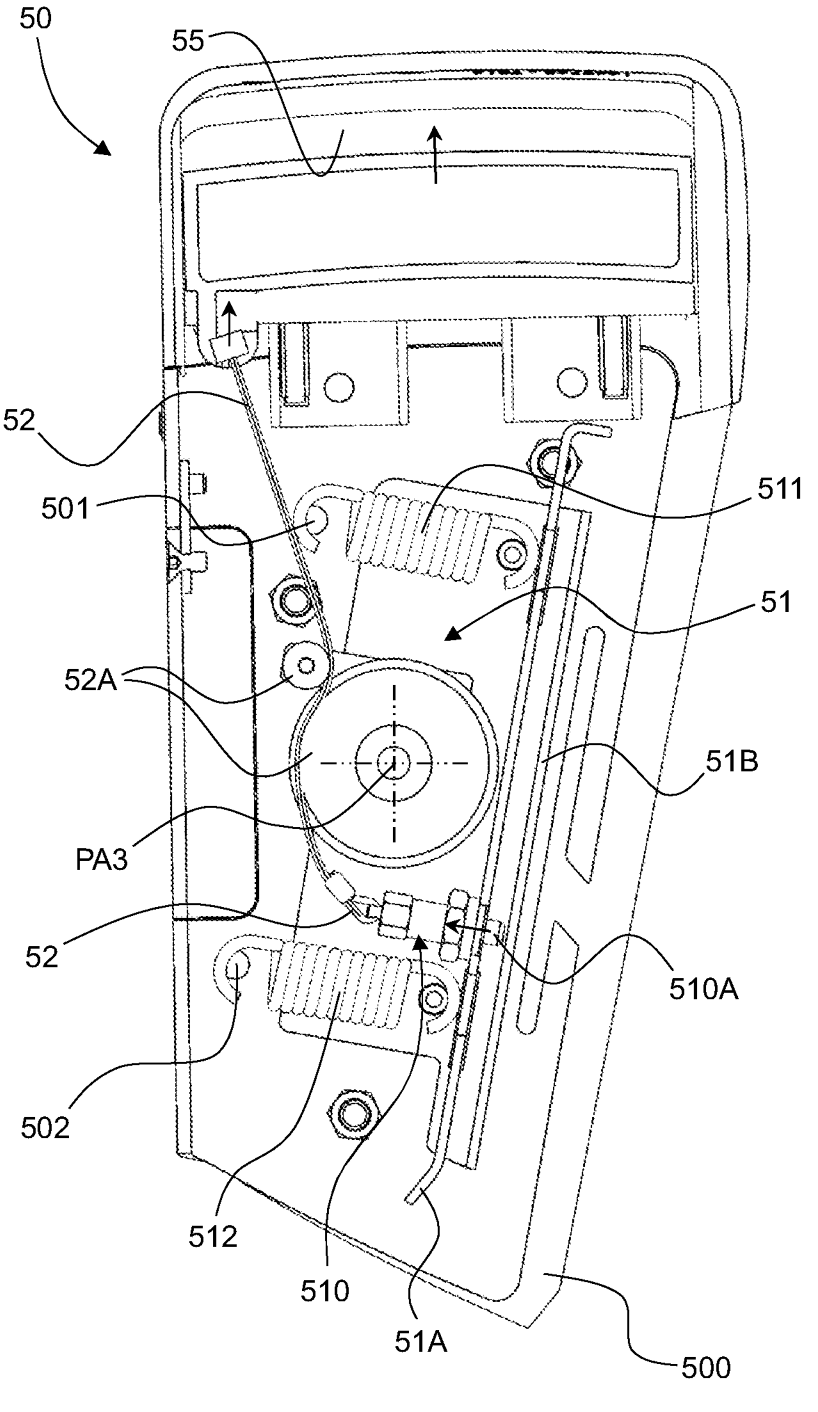
FIG. 5 is an enlarged side view of a cross-section of the leg/knee support as used in connection with the patient lift apparatus of FIG. 1, which leg/knee support is advantageously configured to be selectively releasable from the supporting frame of the patient lift apparatus as well as to be partly pivotable with respect to the supporting frame about a pivot axis and within a defined pivoting range.
Figure 6A:
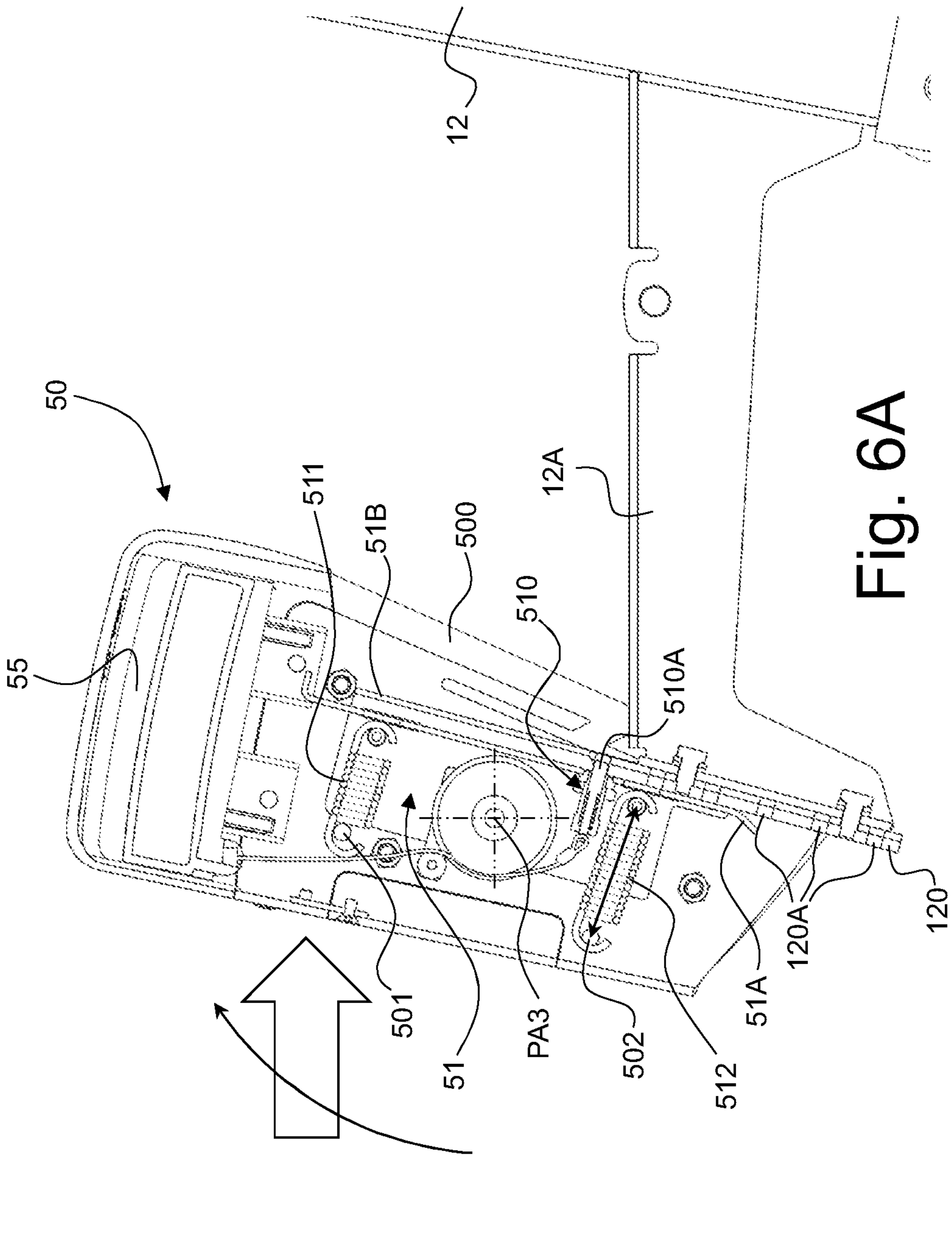
FIGS. 6A and 6B are partial side views of a cross-section of the leg/knee support of FIG. 5, as connected to the supporting frame, illustrating the leg/knee support in two extreme, tilted positions.
Figure 6B:
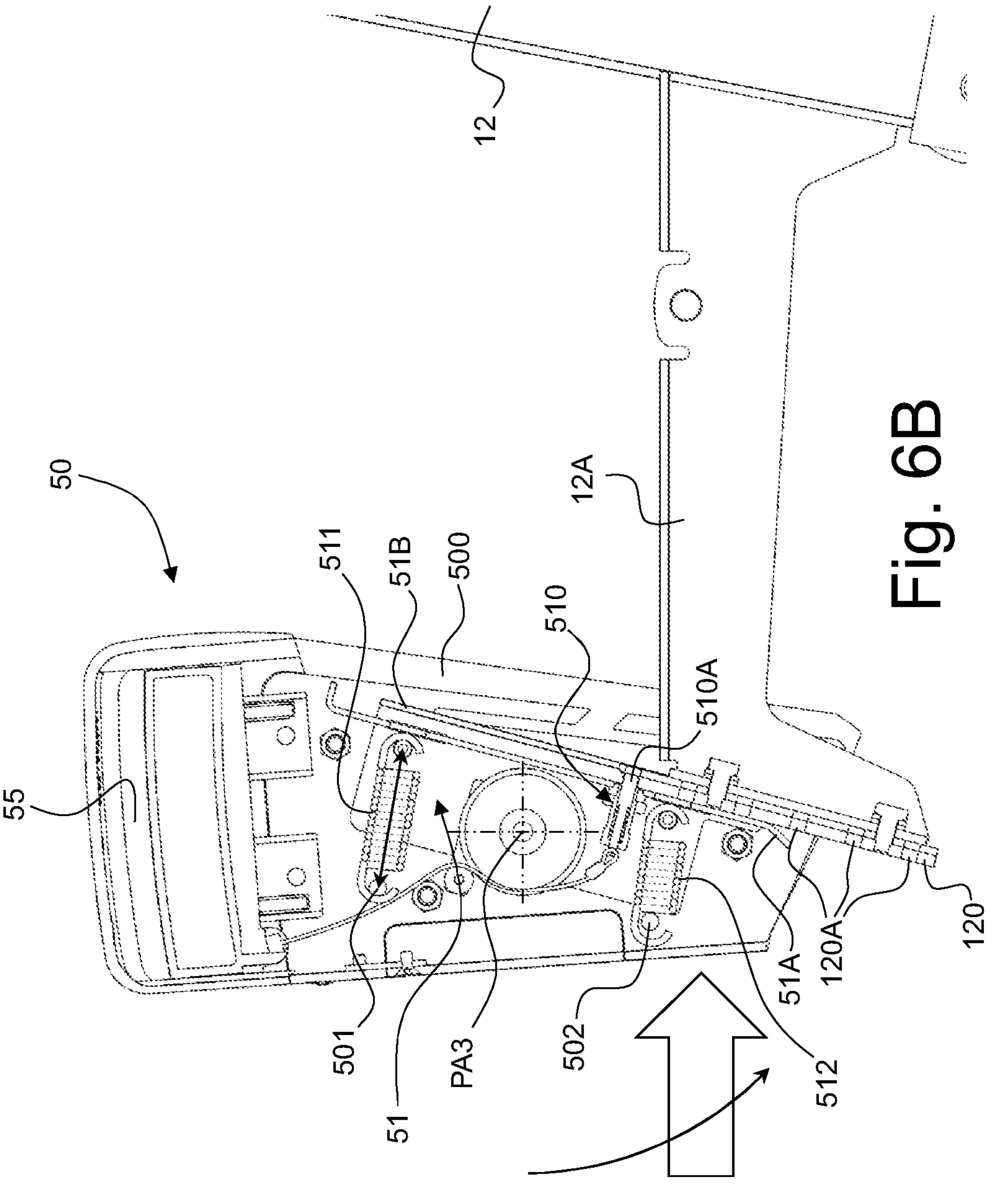

Turning now to FIGS. 5 and 6A-B, there is shown a particularly preferred embodiment of the leg/knee support 50. As this has already been mentioned, the leg/knee support 50 is configured to be selectively releasable from the supporting frame 10. In accordance with this first aspect of the invention, as illustrated in FIG. 5, the leg/knee support 50 comprises a manually-operable release mechanism forming an integral part of the leg/knee support 50, which manually-operable release mechanism is configured to allow selective release of the leg/knee support 50 from the supporting frame 10. This manually-operable release mechanism comprises a retaining device 51 configured to cooperate with the support mount 120 provided on the supporting frame 10, namely at a distal end of the mast extension 12A, as again illustrated in FIGS. 6A-B. The manually-operable release mechanism further comprises a manually-operable handle 55 that cooperates with the retaining device 51 to allow selective release of the retaining device 51 from the support mount 120 and thereby allow removal of the leg/knee support 50 from the supporting frame 10.

As illustrated in FIG. 5, the retaining device 51 may in particular comprise first and second retaining members 51A, 51B forming a spacing therebetween and which are configured to act as a guide dimensioned to receive the support mount 120 (see also FIGS. 2C and 6A-B). More specifically, the first and second retaining members 51A, 51B are designed in such a way that the leg/knee support 50 can be slid onto the support mount 120, engagement and disengagement of the leg/knee support 50 occurring in the illustrated embodiment along a substantially vertical direction.

By way of preference, the manually-operable handle 55 is configured as a sliding handle provided on top of the leg/knee support 50, the handle 55 being guided by and allowed to translate within an upper portion of an outer casing 500 of the leg/knee support 50.

Translation of the movement of the manually-operable handle 55 into a release action of the retaining device 51 (as will be explained hereafter) can be carried out in different ways. One solution may consist in connecting the handle directly to the relevant retaining device or via an articulated linkage. A particularly simple and robust solution may consist, as illustrated in FIG. 5, in coupling the handle 55 to the retaining device 51 via a cable 52. In FIG. 5, reference sign 52A designates guide elements guiding the cable 52 from the handle 55 to the retaining device 51. This solution is particularly simple and provides great freedom for translating the movement of the handle 55 into the required release action of the retaining device 51. In the illustrated example, it will be appreciated that movement of the handle 55 and the release action of the retaining device 51 both occur as translational movements, however along different directions.

In a manner similar to the aforementioned indexing mechanism 200, the retaining device 51 comprises a releasable indexing plunger 510 having a retractable end portion 510A configured to engage with at least one positioning hole 120A provided on the support mount 120. In the illustrated embodiment, the releasable indexing plunger 510 is mounted on the first retaining member 51A and the retractable end portion 510A extends through the spacing formed between the first and second retaining members 51A, 51B towards the second retaining member 51B. In this particular instance, the releasable indexing plunger 510 is mechanically coupled to an end of the cable 52 to cause retraction of the retractable end portion 510 upon actuation of the handle 55.

Only one position hole 120A could be provided for the purpose of securing the leg/knee support 50 to the support mount 120. By way of preference, a plurality of positioning holes 120A are distributed along a portion of the support mount 120 to allow a vertical adjustment of the leg/knee support 50 with respect to the supporting frame 10, as this is visible in FIGS. 2B-C and 6A-B. In that respect, the retractable end portion 510A of the releasable indexing plunger 510 is likewise configured to engage with any selected positioning hole among the plurality of positioning holes 120A to allow adjustment of a vertical position of the leg/knee support 50 with respect to the supporting frame 10.

Like the releasable indexing plunger 210, the releasable indexing plunger 510 is preferably a spring-loaded indexing plunger whose retractable end portion 510A is configured to be urged towards the support mount 120 and to automatically engage with any one of the positioning holes 120A provided on the support mount 120 upon alignment therewith.

It will be appreciated that the aforementioned manually-operable release mechanism provides a simple and robust solution ensuring that the leg/knee support 50 is adequately secured to the supporting frame 10, while allowing easy and quick removal of the leg/knee support 50, without this requiring any tool.

In accordance with another aspect of the invention, which other aspect is advantageously combinable with the aforementioned first aspect of the invention, the leg/knee support 50 is configured to be partly pivotable with respect to the support mount 120 about a pivot axis, identified in FIGS. 5 and 6A-B by reference sign PA3, and within a defined pivoting range. More specifically, the outer casing 500 is configured to be pivotable with respect to the retaining device 51 about the pivot axis PA3 and within said defined pivoting range.

In accordance with this other aspect of the invention, at least one spring element 511, 512 coupling the outer casing 500 to the retaining device 51 is provided, which at least one spring element 511, 512 is configured to bring the outer casing 500 to a default position with respect to the retaining device 51 when no external force is applied onto the outer casing 500. By way of preference, as illustrated in FIG. 5, a pair of spring elements 511, 512 is provided, which pair of spring elements 511, 512 is configured to bring the outer casing 500 to the default position, which default position is a median position between two extreme tilted positions. Such two extreme tilted positions are illustrated in FIG. 6A and FIG. 6B.

More specifically, in the illustrated embodiment, each spring element 511, 512 is a tension spring, namely a spring that stretches as load is applied to it. One end of each spring element 511, 512 is attached to a corresponding location of the retaining device 51 and the other end of each spring element 511, 512 is attached to a corresponding spring mount 501, respectively 502, provided on the outer casing 500. As show in FIG. 5, the first and second spring elements 511, 512 are disposed essentially symmetrically about the pivot axis PA3, meaning that one or the other spring element 511, 512 will stretch as the outer casing 500 pivots about the pivot axis PA3.

Referring to FIG. 6A, which shows the leg/knee support 50 in a first extreme tilted position where the outer casing 500 is pivoted in the clockwise direction about pivot axis PA3, pivotal movement of the outer casing 500 causes an extension of the second (lower) spring element 512 compared to the default position illustrated in FIG. 5. By contrast, the first (upper) spring element 511 is relieved from any tension. In this first extreme tilted position the first (upper) spring mount 501 comes in abutment with a corresponding section of the retaining device 51, preventing further pivotal movement of the outer casing 500 in the clockwise direction. When the external force applied on the outer casing 500 is suppressed (namely when the contact with the patient's legs or knees is interrupted), the second spring element 512 will automatically pull the outer casing 500 to pivot in the counter-clockwise direction and return to the default position.

Referring to FIG. 6B, which shows the leg/knee support 50 in a second extreme tilted position where the outer casing 500 is pivoted in the counter-clockwise direction about pivot axis PA3, pivotal movement of the outer casing 500 conversely causes an extension of the first (upper) spring element 511 compared to the default position illustrated in FIG. 5. By contrast, the second (lower) spring element 512 is relieved from any tension in this case. In this second extreme tilted position the second (lower) spring mount 502 comes in abutment with a corresponding section of the retaining device 51, preventing further pivotal movement of the outer casing 500 in the counter-clockwise direction. When the external force applied on the outer casing 500 is suppressed (namely when the contact with the patient's legs or knees is interrupted), the first spring element 511 will likewise automatically pull the outer casing 500 to pivot in the clockwise direction and return to the default position.

One may thus appreciate that, in accordance with this embodiment of the invention, each spring mount 501, 502 further acts as stop element limiting pivotal movement of the outer casing 500 about the pivot axis PA3. Advantageously, the leg/knee support 50 is configured so that a total amplitude of pivoting movement thereof with respect to the support mount 120 is of the order of 10 to 30 degrees. For the sake of illustration, the leg/knee support 50 shown in FIGS. 5 and 6A-B is here configured to have a pivoting range of the order of +/−8 degrees about de default position, i.e. a total amplitude of pivoting movement of the order of 16 degrees.

The aforementioned solution allowing pivotal movement of the outer casing 500 with respect to the retaining device 51 is of great advantage to improve comfort for the patient during transfer from a seated position to a standing position, and vice versa, as the outer casing 500 will follow the actual and natural movement of the patient's legs and knees during the assisted transfer. The proposed solution is fully integrated and is not made to detriment of the operation of the aforementioned manually-operable release mechanism. In other words, both functions can be implemented, without this leading to a complex arrangement.

Various modifications and/or improvements may be made to the above-described embodiments without departing from the scope of the invention as defined by the annexed claims.

LIST OF REFERENCE NUMERALS AND SIGNS USED THEREIN

1 patient lift apparatus/stand-assist hoist
10 supporting frame

11 base member
12 mast
12A mast extension for connection of leg/knee support 50
13 supporting legs
14 casters
15 boom actuator
15A end of boom actuator 15 connected to mounting bracket 185
16 steering handle
18 boom portion pivotably connected to supporting frame 10
20 handle portions provided on boom portion 18 for manual grip
25 hook portions provided on boom portion 18 for attachment of a sling (not shown)
50 (padded) leg/knee support (or "leg/knee pad") connected to supporting frame 10 via mast extension 12A and support mount 120/configured to be selectively releasable from supporting frame 10 and to be partly pivotable with respect to supporting frame 10
51 retaining device 51 configured to cooperate with support mount 120 to secure leg/knee support 50 onto supporting frame 10 (component of manually-operable release mechanism 51/52/55)
51A (first) retaining member of retaining device 51
51B (second) retaining member of retaining device 51
52 cable coupling manually-operable handle 55 to retaining device 51 (component of manually-operable release mechanism 51/52/55)
52A guide elements for cable 52
55 manually-operable (e.g. sliding) handle cooperating with retaining device 51 to allow selective release of retaining device 51 from support mount 120 (component of manually-operable release mechanism 51/52/55)
60 foot support (or "foot plate") connected to supporting frame 10 via base member 11
120 support mount provided on supporting frame 10 at an end of mast extension 12A
120A positioning holes distributed along portion of support mount 120
180 telescopic arm 180 of boom portion 18
181 outer member of telescopic arm 180
181A inner side of outer member 181
182 inner member of telescopic arm 180 telescopically received inside outer member 181
182A positioning holes distributed longitudinally along portion of inner member 182
182B outer periphery of inner member 182
185 mounting bracket located on lower portion of outer member 181 and supporting manually-operable release lever 250
200 indexing mechanism configured to allow positioning of inner member 182 at a plurality of predefined longitudinal positions with respect to outer member 181
210 releasable (e.g. spring-loaded) indexing plunger of indexing mechanism 200/mounted on outer member 181
210A retractable end portion of releasable indexing plunger 210 configured to engage with selected positioning hole 182A
250 manually-operable release lever of indexing mechanism 200/mechanically linked to releasable indexing plunger 210
250A end of manually-operable release lever 250 coupled to releasable indexing plunger 210
250B pivot of manually-operable release lever 250
280 cover element located on bracket 185 covering part of indexing mechanism 200 and preventing finger or hand entrapment
300 centering system designed to suppress clearance between outer member 181 and inner member 182
310 (first) centering element of centering system 300 mounted on outer member 181/(spring-loaded) bushing member mounted on distal end portion of outer member 181 and interposed between inner side 181A of outer member 181 and outer periphery 182B of inner member 182
310A extensions on bushing member 310 for mounting flat spring elements 315
310B extensions on bushing member 310 for attachment to distal end portion of outer member 181
315 flat spring elements mounted on extensions 310A and designed to press against inner side 181A of outer member 181 and press extensions 310A inwardly towards outer periphery 182B of inner member 182
320 (second) centering element of centering system 300 mounted on inner member 182/guide member mounted on distal end portion of inner member 182 and guided inside the outer member 181
320A guide surfaces on outer periphery of guide member 320 for guidance against inner side 181A of outer member 181
500 outer casing of leg/knee support 50
500A support surfaces on outer casing 500 for supporting patient's legs/knees
501 (first) spring mount on outer casing 500 for (first) spring element 511/(first) stop element)
502 (second) spring mount on outer casing 500 for (second) spring element 512/(second) stop element
510 releasable (e.g. spring-loaded) indexing plunger of retaining device 51
510A retractable end portion of releasable indexing plunger 510 configured to engage with selected positioning hole 120A
511 (first) spring element (e.g. tension spring) coupling outer casing 500 to retaining device 51/configured to bring outer casing 500 to default position with respect to retaining device 51
512 (second) spring element (e.g. tension spring) coupling outer casing 500 to retaining device 51/configured to bring outer casing
500 to default position with respect to retaining device 51
PA1 pivot axis of boom portion 18 with respect to mast 12 (parallel to y-axis)
PA2 pivot axis of manually-operable release lever 250 with respect to mounting bracket 185
PA3 pivot axis of outer casing 500 with respect to retaining device 51
PJ1 pivot joint between boom portion 18 and mast 12

The invention claimed is:

1. A patient lift apparatus comprising a supporting frame, a boom portion connected to the supporting frame via a pivot joint to allow the boom portion to pivot with respect to the supporting frame about a first pivot axis, a boom actuator to mechanically assist pivotal movement of the boom portion with respect to the supporting frame, and a leg/knee support connected to the supporting frame, wherein the leg/knee support is configured to be selectively releasable from the supporting frame, wherein the leg/knee support comprises a manually-operable release mechanism forming an integral part of the leg/knee support, which manually-operable release mechanism is configured to allow selective release of the leg/knee support from the supporting frame, said manually-operable release mechanism comprising:

a retaining device housed within an outer casing of the leg/knee support and configured to cooperate with a support mount provided on the supporting frame to secure the leg/knee support onto the supporting frame; and a manually-operable handle cooperating with the retaining device to allow selective release of the retaining device from the support mount and thereby allow removal of the leg/knee support from the supporting frame.

2. The patient lift apparatus according to claim 1, wherein the leg/knee support is configured to be slidable along the support mount upon being released by the manually-operable release mechanism.

3. The patient lift apparatus according to claim 2, wherein the retaining device comprises first and second retaining members forming a spacing therebetween and which are configured to act as a guide dimensioned to receive the support mount, the first and second retaining members being configured to allow sliding movement of the leg/knee support onto the support mount.

4. The patient lift apparatus according to claim 1, wherein the manually-operable handle is configured as a sliding handle provided on top of the leg/knee support.

5. The patient lift apparatus according to claim 1, wherein the manually-operable release mechanism further comprises a cable coupling the manually-operable handle to the retaining device and translating a movement of the manually-operable handle into a release action of the retaining device.

6. The patient lift apparatus according to claim 1, wherein the retaining device comprises a releasable indexing plunger having a retractable end portion configured to engage with at least one positioning hole provided on the support mount.

7. The patient lift apparatus according to claim 6, wherein the support mount comprises a plurality of positioning holes distributed along a portion of the support mount and wherein the retractable end portion of the releasable indexing plunger is configured to engage with any selected positioning hole among the plurality of positioning holes to allow adjustment of a vertical position of the leg/knee support with respect to the supporting frame.

8. The patient lift apparatus according to claim 6, wherein the releasable indexing plunger is a spring-loaded indexing plunger whose retractable end portion is configured to be urged towards the support mount and to automatically engage with each positioning hole upon alignment therewith.

9. The patient lift apparatus according to claim 1, wherein the leg/knee support is configured to be partly pivotable with respect to the support mount about a second pivot axis and within a defined pivoting range.

10. The patient lift apparatus according to claim 9, wherein the outer casing of the leg/knee support is configured to be pivotable with respect to the retaining device about the second pivot axis and within said defined pivoting range.

11. The patient lift apparatus according to claim 1, wherein the boom portion is configured as a telescopic arm comprising an outer member and an inner member that is telescopically received inside the outer member to allow displacement of the inner member with respect to the outer member and adjustment of an effective length of the telescopic arm.

12. The patient lift apparatus according to claim 11, wherein the patient lift apparatus further comprises an indexing mechanism configured to allow positioning of the inner member at a plurality of predefined longitudinal positions with respect to the outer member.

13. A patient lift apparatus comprising a supporting frame, a boom portion connected to the supporting frame via a pivot joint to allow the boom portion to pivot with respect to the supporting frame about a first pivot axis, a boom actuator to mechanically assist pivotal movement of the boom portion with respect to the supporting frame, and a leg/knee support connected to the supporting frame, wherein the leg/knee support is configured to be selectively releasable from the supporting frame, wherein the leg/knee support comprises a manually-operable release mechanism forming an integral part of the leg/knee support, which manually-operable release mechanism is configured to allow selective release of the leg/knee support from the supporting frame, said manually-operable release mechanism comprising:

a retaining device configured to cooperate with a support mount provided on the supporting frame to secure the leg/knee support onto the supporting frame; and a manually-operable handle cooperating with the retaining device to allow selective release of the retaining device from the support mount and thereby allow removal of the leg/knee support from the supporting frame, wherein the leg/knee support is configured to be partly pivotable with respect to the support mount about a second pivot axis and within a defined pivoting range, wherein the leg/knee support comprises an outer casing configured to be pivotable with respect to the retaining device about the second pivot axis and within said defined pivoting range, and wherein the leg/knee support further comprises at least one spring element coupling the outer casing to the retaining device, which at least one spring element is configured to bring the outer casing to a default position with respect to the retaining device when no external force is applied onto the outer casing.

14. The patient lift apparatus according to claim 13, wherein a pair of said spring elements is provided, which pair of spring elements is configured to bring the outer casing to the default position, which default position is a median position between two extreme, tilted positions, and wherein each spring element is attached to a corresponding spring mount provided on the outer casing.

15. The patient lift apparatus according to claim 14, wherein the spring mount further acts as stop element limiting pivotal movement of the outer casing about the second pivot axis.

16. The patient lift apparatus according to claim 13, wherein each spring element is a tension spring.

17. The patient lift apparatus according to claim 13, wherein a total amplitude of pivoting movement of the leg/knee support with respect to the support mount is of the order of 10 to 30 degrees.

18. A patient lift apparatus comprising a supporting frame, a boom portion connected to the supporting frame via a pivot joint to allow the boom portion to pivot with respect to the supporting frame about a first pivot axis, a boom actuator to mechanically assist pivotal movement of the boom portion with respect to the supporting frame, and a leg/knee support connected to the supporting frame, wherein the leg/knee support comprises:

a retaining device configured to cooperate with a support mount provided on the supporting frame to secure the leg/knee support onto the supporting frame, the leg/knee support being configured to be partly pivotable with respect to the support mount about a second pivot axis and within a defined pivoting range;

an outer casing configured to be pivotable with respect to the retaining device about the second pivot axis and within said defined pivoting range; and at least one spring element coupling the outer casing to the retaining device, which at least one spring element is configured to bring the outer casing to a default position with respect to the retaining device when no external force is applied onto the outer casing.

19. The patient lift apparatus according to claim 18, wherein a pair of said spring elements is provided, which pair of spring elements is configured to bring the outer casing to the default position, which default position is a median position between two extreme, tilted positions, and wherein each spring element is attached to a corresponding spring mount provided on the outer casing.

20. The patient lift apparatus according to claim 19, wherein the spring mount further acts as stop element limiting pivotal movement of the outer casing about the second pivot axis.

21. The patient lift apparatus according to claim 18, wherein each spring element is a tension spring.

22. The patient lift apparatus according to claim 18, wherein a total amplitude of pivoting movement of the leg/knee support with respect to the support mount is of the order of 10 to 30 degrees.

23. The patient lift apparatus according to claim 18, wherein the boom portion is configured as a telescopic arm comprising an outer member and an inner member that is telescopically received inside the outer member to allow displacement of the inner member with respect to the outer member and adjustment of an effective length of the telescopic arm.

24. The patient lift apparatus according to claim 23, wherein the patient lift apparatus further comprises an indexing mechanism configured to allow positioning of the inner member at a plurality of predefined longitudinal positions with respect to the outer member.

* * * * *